United States Patent Office 3,714,215
Patented Jan. 30, 1973

3,714,215
N,N-DIALKYL SUBSTITUTED ETHOXYMETHYL-ENE IMMONIUM HALIDES AND METHOD
Pierre Marie Joseph Ghislain de Radzitzky d'Ostrowick and Alain Joseph Guillaume de Roocker, Brussels, Belgium, assignors to Labofina, Soc. Am., Brussels, Belgium
No Drawing. Filed Mar. 23, 1970, Ser. No. 22,031
Int. Cl. C07c 119/18, 119/20, 119/16
U.S. Cl. 260—453 R    10 Claims

ABSTRACT OF THE DISCLOSURE

N,N-dialkyl(2-halo-1-substituted ethoxymethylene)immonium halides are formed by halogenation of olefines in the presence of N,N-dilower alkyl formamide to form new compounds and derivatives. The compounds are decomposed to valuable 1,2-dihalocompounds, 1-halo-2-formates and halohydrins by thermal decomposition, hydrolysis or alcoholysis.

---

The present invention is directed to N,N-dialkyl(2-halo-1-substituted ethoxymethylene)immonium halides and to an improved method of preparing these compounds by direct reaction.

The N,N-dialkyl(2-halo-1-substituted ethoxymethylene) immonium halides have the structure

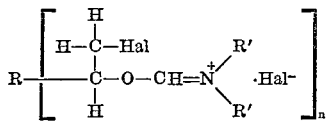

wherein $n$ is an integer of 1 to 3; R' are identical lower alkyl radicals having from 1 to 3 carbon atoms; Hal are identical halogen atoms of the group consisting of chlorine and bromine; R are hydrocarbon radicals having 1 to 9 carbon atoms, R being a monoradical selected from the group consisting of alkyl radicals having 1 to 8 carbon atoms and cyclic hydrocarbon radicals having 5 to 6 carbon atoms in the ring such as cyclopentyl, cyclohexyl and phenyl radicals, said cyclic hydrocarbon radicals having 0 to 3 ring substituents of the group consisting of halogen atom and lower alkyl radicals having 1 to 3 carbon atoms, when $n$ is 1; R being a diradical selected from the group consisting of alkyl radicals having 1 to 6 carbon atoms and of 1,3- and 1,4-benzenic diradicals when $n$ is 2; R being a 1,3,5-benzenic triradical when $n$ is 3.

The starting olefine compound for the manufacture of the compounds having the above formula may be any terminal olefin such as 1-heptene, 4-methyl-1-pentene, 1-hexene, 1,6-heptadiene, vinylcyclohexane, vinylcyclopentane, styrene, m- and p-divinylbenzene, 1,3,5-trivinylbenzene, m-ethyl-styrene, p-ethylstyrene, m-methylstyrene, m-chlorostyrene, and p-propylstyrene. Thus, in general, the olefines are aliphatic mono- or diolefines including the —CH=CH₂ group, mono- and polyvinyl benzenes and their lower alkyl and halo ring derivatives.

N,N-dialkyl(2-halo-1-substituted ethoxymethylene)immonium halides of this invention are formed by reacting the olefine with halogen in the presence of an equimolar, preferably an excess, of dilower alkyl formamide at ambient to lower temperatures. N,N-dimethyl formamide is especially suitable, although other lower dialkyl formamide such as diethyl or dipropyl formamide may be used, the dimethyl being the most economically available industrially.

The dialkyl formamides possess a basic character which helps to prevent the hydrogen chloride or bromide, evolved from side reactions, from adding onto the olefinic double bond instead of chlorine or bromine. It is beneficial to use the dialkyl formamide in excess of the stoichiometric amount. For one equivalent of olefinic function, one mol of chlorine or bromine and at least one mol of dialkyl formamide are used, an excess of between 0.01 and 4 mols of the latter being beneficial. Said excess can be higher, such as up to ten mols without impairing the reaction. As the immonium halide is either a crystalline solid or a viscous oil, an excess of dialkyl formamide enables the medium to be kept fluid until the addition of halogen is completed.

The reaction can be practiced by mixing the olefinic compound with the dialkyl formamide, and then introducing the halogen. Another advantageous manner of operation consists in adding simultaneously and in stoichiometric amount the halogen and the olefin to the dialkyl formamide, the latter being possibly in excess. In some cases it may be advantageous economically to dissolve the halogen into the dialkyl formamide and add the resulting solution to the olefin either pure or dissolved beforehand into the dialkyl formamide. Thus there are many methods of carrying out the reaction, but it is advisable to avoid contacting the olefine with a great excess of halogen in order to minimize side reactions.

The preparation of the immonium halides according to the process of the present invention is preferably carried out at a temperature in the range of $-20°$ C. and $+40°$ C., preferably between $-20°$ C. and $+10°$ C. At higher temperatures the immonium halide thermally decomposes into the addition product of the halogen onto the olefinic double bond.

For isolating the immonium halide, it is advantageous to keep the reaction mixture at a comparatively low temperature in order to prevent any decomposition. The salt commonly consists of a crystalline precipitate, which can be separated from the excess of dialkyl formamide by filtration. Sometimes it is convenient to add an inert solvent, wherein the immonium halide is not soluble, in order to promote filtration and wash the crystals. Ether, carbon tetrachloride, benzene and heptene are all useful and suitable solvents. The crystals may be dried under vacuum and must be kept away from moisture in order to prevent any decomposition by hydrolysis. In the case where the immonium halide consists of a viscous oil, it can be separated by settling, and purified by washing with ether or with another of the above-mentioned solvents.

The N,N - dialkyl(2-halo-1-substituted ethoxymethylene)immonium halides are useful intermediates in the preparation of dihalogen adduct derivatives of the starting olefines by thermal decomposition, 1-halo-2-formates by hydrolysis, and halohydrins by alcoholysis. Each of these decomposition products are useful fire retardants for incorporation into readily combustible polymers and plastics. For instance, polystyrene containing these fire retardants which is ordinarily readily combustible, cannot be ignited or, if ignited at high temperature, is self-extinguishing. The formation of these intermediates is illustrated by the following reactions:

(a) Thermal decomposition

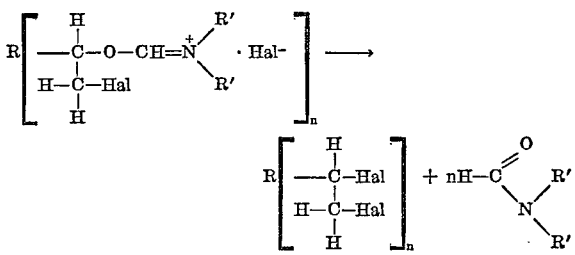

(b) Hydrolysis

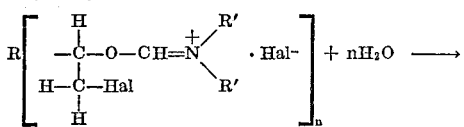

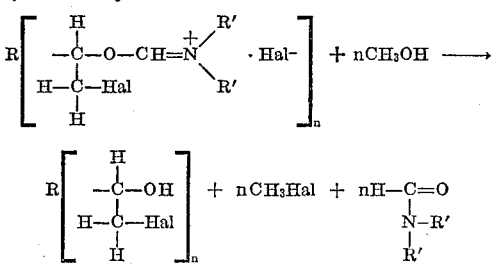

(c) Alcoholysis

It therefore appears that thermal decomposition of immonium halides results in the addition product of the halogen onto the olefin, while regenerating the dialkyl formamide with an almost quantitative yield. This combination of reactions comprising the synthesis of immonium halide and its thermal decomposition is especially interesting, as the direct addition of chlorine into an olefin is always accompanied with side reactions such as dehydrochlorination or substitution. For instance, direct chlorination of styrene yields, even at a very low conversion, maximum three parts of the desired 1,2-dichloro-1-phenylethane for one part of 2-chloro-1-phenylethylene. When an attempt is made to increase the conversion, important amounts of 1,2,2-trichloro-1-phenylethane are formed. 1,2-dichloro-1-phenylethane may easily be transformed into phenylacetylene which is an important monomer in the synthesis of heat stable polymers.

By hydrolysis one formyloxy group and one atom of chlorine or bromine are linked onto the double bond, while the dialkyl amine hydrochloride or hydrobromide is formed.

Alcoholysis makes it possible to obtain the halohydrin of the olefin and an alkyl halide, while the dialkyl formamide is regenerated.

Other characteristics and inherent advantages will become apparent from the examples herein which illustrate the practice of the present invention.

EXAMPLE I

This example illustrates the preparation of N,N-dimethyl(2-chloro - 1 - phenylethoxymethylene)immonium chloride.

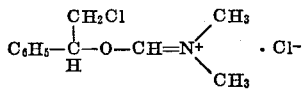

resulting from the addition of N,N-dimethyl formamide and chlorine onto styrene.

At 0° C. and within forty-five minutes, in the dark and under anhydrous conditions, 71 grams (1 mol) of chlorine and a mixture of 104 grams (1 mol) of styrene and 150 grams of N,N-dimethyl formamide are introduced simultaneously into a flask equipped with an agitating device and containing 142 grams of N,N-dimethyl formamide (4 mols totally). A white precipitate of the immonium chloride is gradually formed. At the end of the reaction, 200 milliliters of ether are added, then the precipitate is separated by filtration, washed with ether, dried under vacuum at room temperature, all this under anhydrous conditions.

Thus 192 grams i.e. 77% immonium chloride of the above formula is obtained. When ether is replaced with benzene, heptane or carbon tetrachloride, practically identical results are obtained. When the total amount of dimethyl formamide is reduced to 2 mols, the yield of immonium chloride is 75.5%. The excess of dimethyl formamide, together with a little of 1,2-dichloro-1-phenylethane, can be recovered by distillation of the filtrate.

When the aforesaid immonium chloride undergoes gradual heating, it decomposes between 80° C. and 85° C., into N,N-dimethyl formamide and 1,2-dichloro-1-phenylethane which may be separated and recovered almost quantitatively by distillation, preferably under reduced pressure of about 10 mm. Hg.

EXAMPLE II

The reaction of Example I is carried out except that the chlorine is replaced with 1 mol (160 grams) of bromine.

A 39.5% yield of the corresponding immonium bromide of the formula

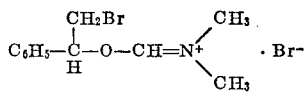

i.e. the N,N-dimethyl(2-bromo-1-phenylethoxymethylene) immonium bromide, which was never described until now is obtained.

Analysis of this product gave.—Calcd. (percent): C, 39.20; H, 4.48; Br, 47.40; N, 4.27. Found (percent): C, 39.70; H, 4.55; Br, 47.25; N, 4.16.

Hydrolysis of this bromide gives an organic phase which, after extraction with ether and fractional distillation of the extract, gives with an 81% yield of 2-bromo-1-phenylethyl formate, a new product having the following characteristics:

Boiling point: 105–110° C., under 4 mm. Hg
Refractive index: $n_D^{20}=1.5538$

Dimethylamine hydrobromide is recovered, with a quantitative yield, by concentration of the aqueous phase.

The 2-bromo-1-phenylethylformate may be added to polystyrene to impart fire retardant characteristics to this polymer.

EXAMPLE III

The reaction is carried out exactly according to the process of Example I, except that m-chlorostyrene is substituted for styrene.

N,N-dimethyl[2-chloro - 1 - (m - chlorophenyl)ethoxymethylene]immonium chloride

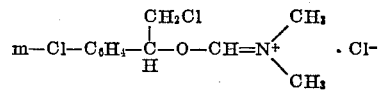

is obtained with a yield of 68%.

Analysis of this product gave.—Calcd. (percent): C, 46.70; H, 4.98; Cl, 37.60; N, 4.95. Found (percent): C, 46.15; H, 5.42; Cl, 34.88; N, 5.04.

EXAMPLE IV

Proceeding as in Example I, but substituting for the styrene m-ethylstyrene, N,N-dimethyl[2-chloro-1-(m-ethylphenyl)ethoxymethylene]immonium chloride is obtained having the formula

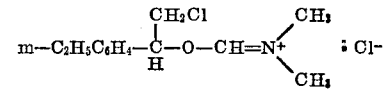

in a 68% yield.

Analysis of this product gave.—Calcd. (percent): C, 56.50; H, 6.93; Cl, 25.65; N, 5.07. Found (percent): C, 56.78; H, 6.57; Cl, 25.42; N, 4.81.

EXAMPLE V

Proceeding as in Example I, but substituting for the styrene 1-heptene, N,N-dimethyl(2-chloro-1-pentyl-ethoxymethylene)immonium chloride is obtained having the formula

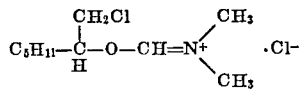

in a 32% yield.

Analysis of this product gave.—Calculated (percent): C, 49.60; H, 8.75; Cl, 29.30; N, 5.80. Found (percent): C, 50.23; H, 8.25; Cl, 28.50; N, 5.67.

EXAMPLE VI

In the dark and under anhydrous conditions, 71 grams (1 mol) of chlorine is introduced at 0° C. within ninety minutes into a flask equipped with an agitating device and containing a mixture of 66.5 grams (0.5 mol) of m-divinylbenzene and 74 grams (1.01 mol) of dimethyl formamide. Benzene 1,3 bis[dimethyl (2-chloro-1-ethoxymethylene)immonium chloride], a viscous oil, is precipitated from the reaction mixture by means of ether.

By vacuum distillation under 10 mm. Hg, between 40° C. and 45° C., N,N-dimethyl formamide, contaminated by a small amount of its chlorohydrate, is recovered. When the pressure is decreased gradually to 2 mm. Hg, 3.3 grams of a fraction boiling up to 150° C. is obtained, then 112.5 grams of m-bis(1,2-dichloroethyl) benzene (an 83% yield), is obtained boiling between 150° C. and 160° C.

When eight mols of dimethyl formamide are used for one mol of divinylbenzene, m-bis(1,2-dichloroethyl)benzene is obtained with an 88% yield.

EXAMPLE VII

In the dark and under anhydrous conditions, a solution of 13 grams (0.1 mol) of p-divinylbenzene in 30 grams of N,N-dimethyl formamide and 14.2 grams (0.2 mol) of chlorine are introduced at 0° C. and within thirty minutes into a flask equipped with an agitating device, and already containing 28.4 grams of N,N-dimethyl formamide, the total amount of N,N-dimethyl formamide being 58.4 grams (0.8 mol). Benzene-1,4-bis[dimethyl (2-chloro-1-ethoxymethylene)immonium chloride] is obtained as a white precipitate with a yield of 76.5% of the theoretical.

EXAMPLE VIII

The reaction is carried out as in Example I, except that an equimolar amount of N,N-diethyl formamide is substituted for the N,N-dimethyl formamide.

N,N-diethyl(2-chloro - 1 - phenylethoxymethylene)immonium chloride is thus obtained having the formula

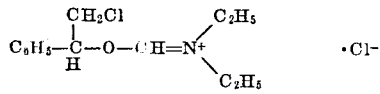

with a 76.2% yield.

What is claimed is:
1. The method of forming a compound of the formula

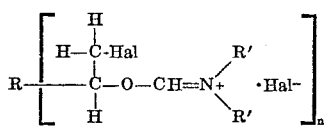

wherein $n$ is an integer of 1 to 3; R' are identical lower alkyl radicals having from 1 to 3 carbon atoms; Hal are identical halogen atoms of the group consisting of chlorine and bromine; R is a hydrocarbon radical having 1 to 9 carbon atoms, R being a monoradical selected from the group consisting of alkyl radicals having from 1 to 8 carbon atoms and cyclic hydrocarbon radicals of the group consisting of cycloalkyl radicals having 5 to 6 carbon atoms in the ring and phenyl, said cyclic hydrocarbon radicals having 0 to 3 ring substituents of the group consisting of chlorine and bromine and lower alkyl radicals having 1 to 3 carbon atoms, when $n$ is 1; R being a diradical selected from the group consisting of alkyl radicals having 1 to 6 carbon atoms, 1,3- and 1,4-benzenic diradicals, when $n$ is 2; R being a 1,3,5-benzenic triradical when $n$ is 3, comprising reacting a halogen selected from the group consisting of chlorine and bromine with at least about an equivalent quantity of a dialkylformamide

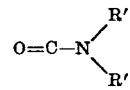

and an olefinic hydrocarbon of the formula $(CH=CH_2)_n$, R, R' and $n$ being defined as above at a temperature ranging approximately from about −20° C. to +40° C.

2. The method as defined in claim 1 wherein the olefine is selected from the group consisting of terminal monoolefines, terminal diolefines, vinylcycloalkanes, mono- and polyvinyl aromatic hydrocarbons and their lower alkyl and halogen ring substituted derivatives, the lower alkyl radical having one to three carbon atoms.

3. Method for preparing N,N-dialkyl (2-halo-1-substituted ethoxymethylene) immonium halides as defined in claim 1 wherein the halogen atoms are identical and are chlorine or bromine, and wherein the alkyl radicals are identical and have no more than three carbon atoms, the halogen being directly reacted with a N,N-dialkyl formamide and an olefinic compound selected from the group comprising aliphatic terminal mono- and terminal diolefinic hydrocarbons, vinylcycloalkanes, mono- and polyvinylic derivatives of aromatic hydrocarbons and their ring alkyl-substituted and ring halo-substituted derivatives.

4. The method as defined in claim 3 wherein the N,N-dialkyl formamide is selected from the group consisting of N,N-dimethyl formamide and N,N-diethyl formamide.

5. The method as defined in claim 3 wherein the N,N-dialkyl formamide is used in an excess which is not higher than ten mols per mol of olefinic compound.

6. The method as defined in claim 5 wherein the excess of N,N-dialkyl formamide is between 0.01 and 4 mols per mol of olefinic compound.

7. N,N - dimethyl(2-bromo-1-phenylethoxymethylene) immonium bromide.

8. N,N - dimethyl[2-chloro-1-(m-chlorophenyl)ethoxymethylene]immonium chloride.

9. N,N - dimethyl[2-chloro-1-(m-ethylphenyl)ethoxymethylene]immonium chloride.

10. N,N-dimethyl(2 - chloro - 1 - pentylethoxymethylene)immonium chloride.

References Cited

UNITED STATES PATENTS 3,294,785  12/1966  Tanabe _____ 260—566 D

FOREIGN PATENTS 2,023,429  11/1970  Germany _____ 260—453 R

LEWIS GOTTS, Primary Examiner

G. HOLLRAH, Assistant Examiner

U.S. Cl. X.R.

260—45.7 R, 45.85, 479 R, 497, 634, 660

UNITED STATES PATENT OFFICE
CERTIFICATE OF CORRECTION

Patent No. 3,714,215  Dated January 30, 1973

Inventor(s) DeRadzitzky d'Ostrowick et al.

It is certified that error appears in the above-identified patent and that said Letters Patent are hereby corrected as shown below:

Column 6, line 18, the formula "$(CH=cH_2)_n$" should read -- $R(CH=CH_2)_n$ --.

Signed and sealed this 4th day of March 1975.

(SEAL)
Attest:

RUTH C. MASON
Attesting Officer

C. MARSHALL DANN
Commissioner of Patents
and Trademarks